May 8, 1934.  A. GAY  1,957,827
ENVELOPE SEALING MACHINE
Filed May 11, 1931  7 Sheets-Sheet 4
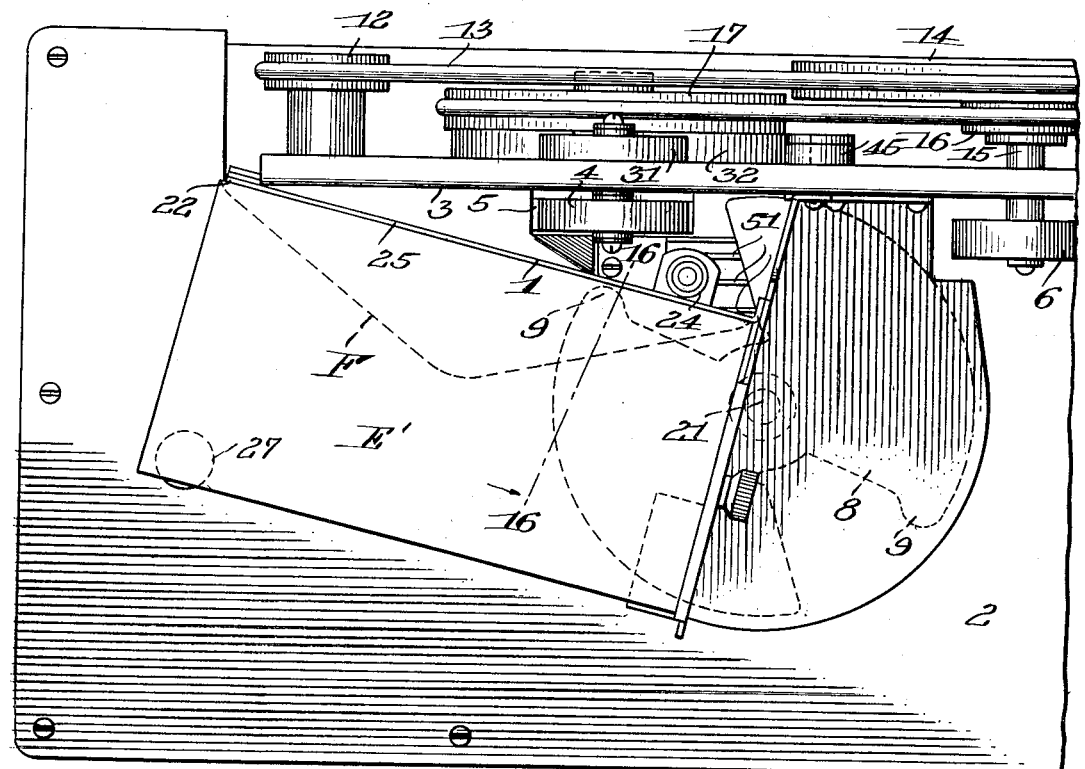
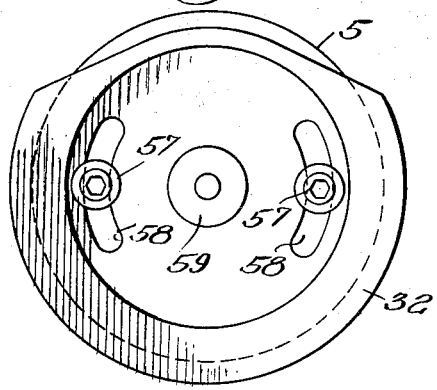
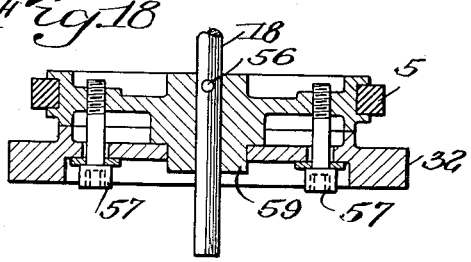
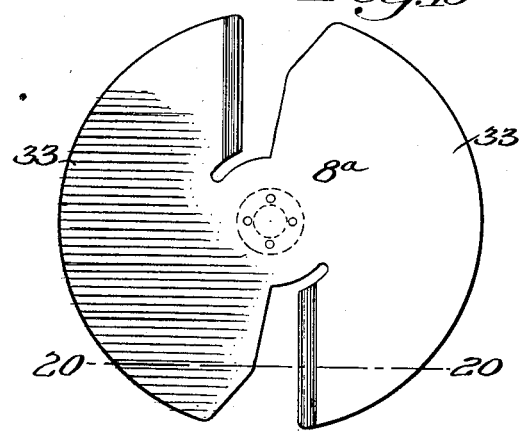
INVENTOR
Azel Gay
BY
his ATTORNEY May 8, 1934.                A. GAY                1,957,827
ENVELOPE SEALING MACHINE
Filed May 11, 1931            7 Sheets-Sheet 5
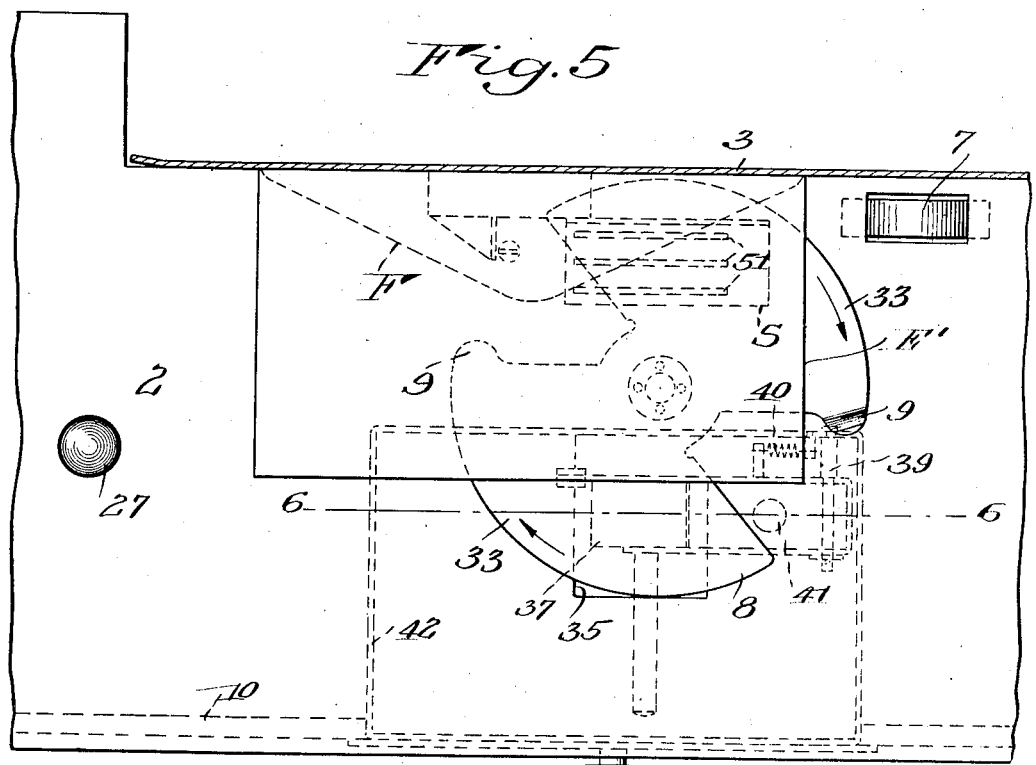
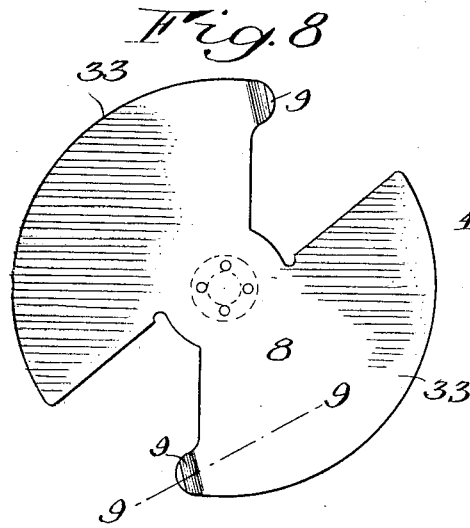
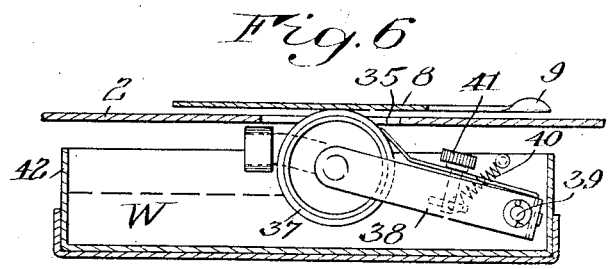
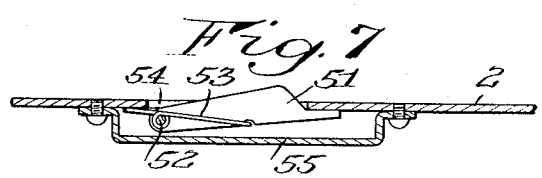
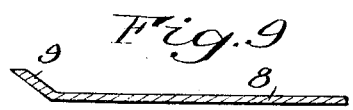
INVENTOR
Azel Gay
BY
his ATTORNEY May 8, 1934.　　　　　A. GAY　　　　　1,957,827
ENVELOPE SEALING MACHINE
Filed May 11, 1931　　　7 Sheets-Sheet 6

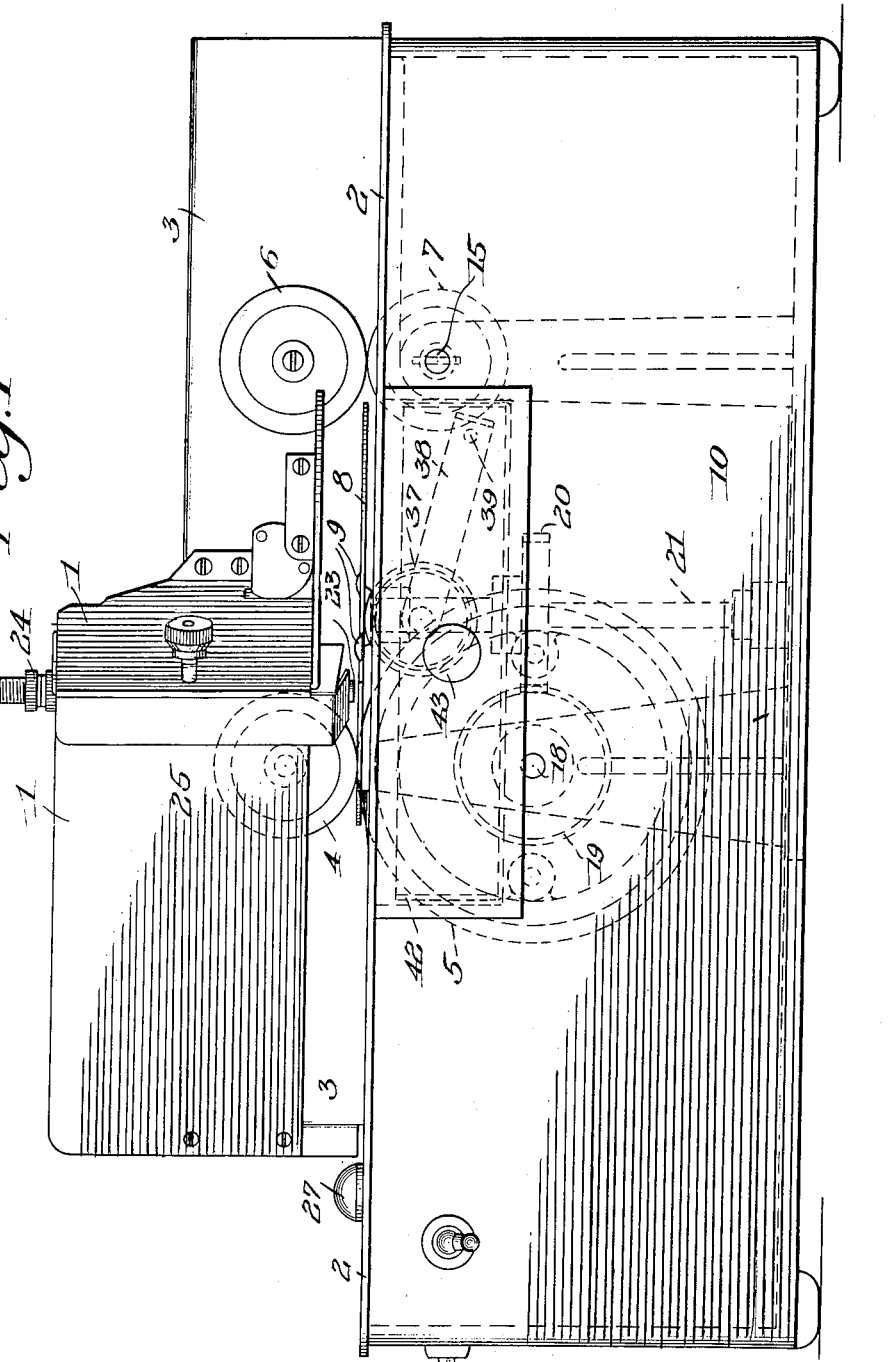

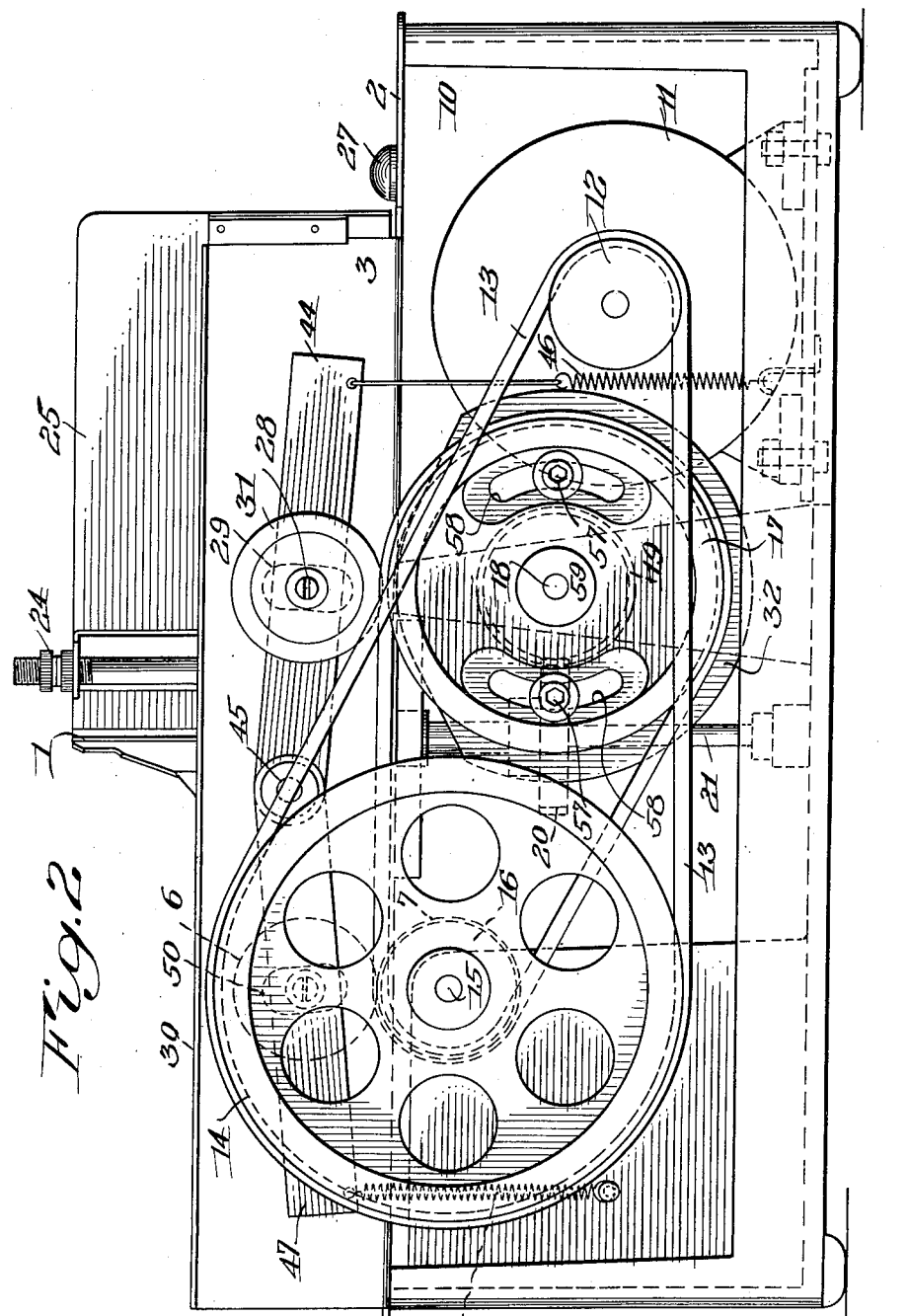

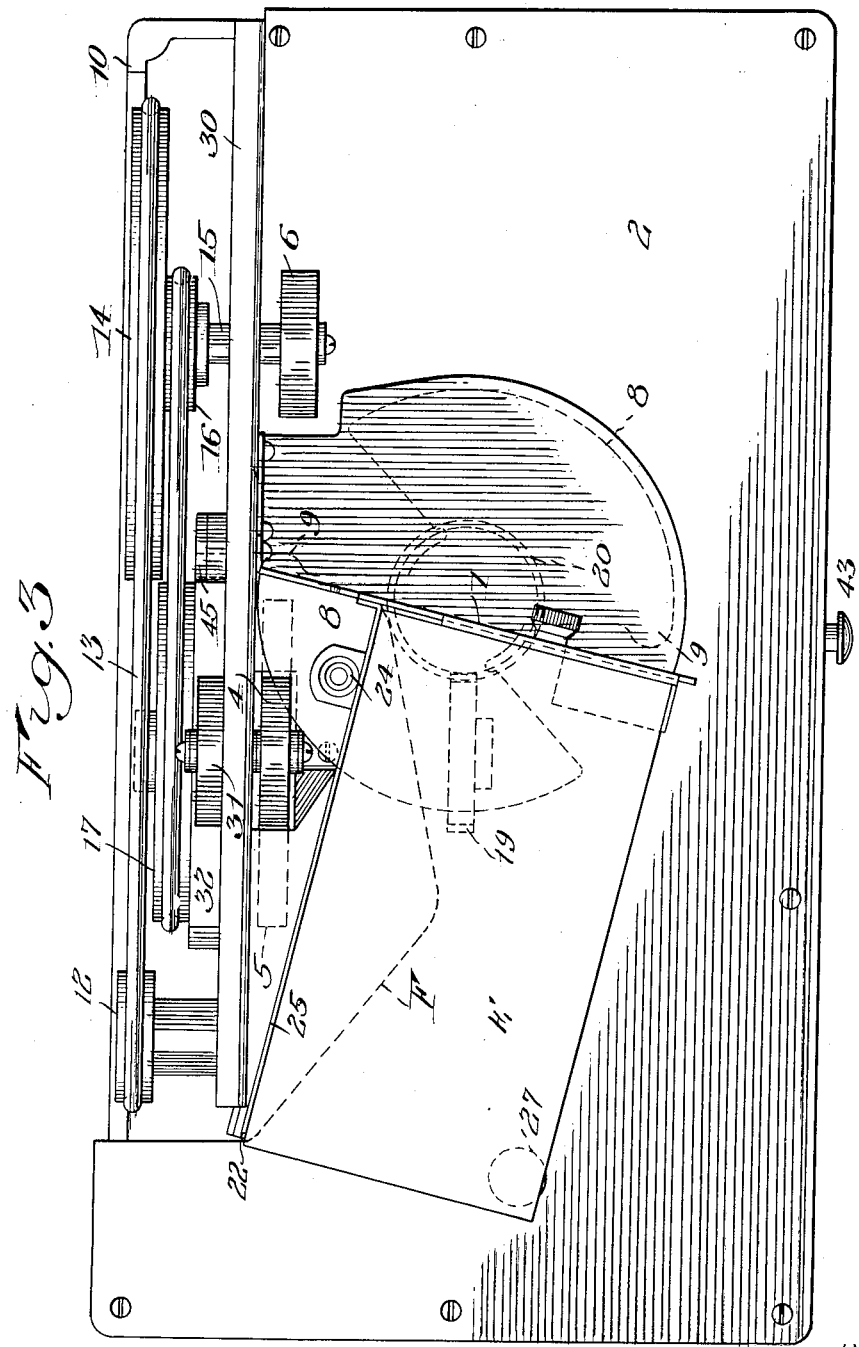

INVENTOR
Azel Gay
BY
his ATTORNEY

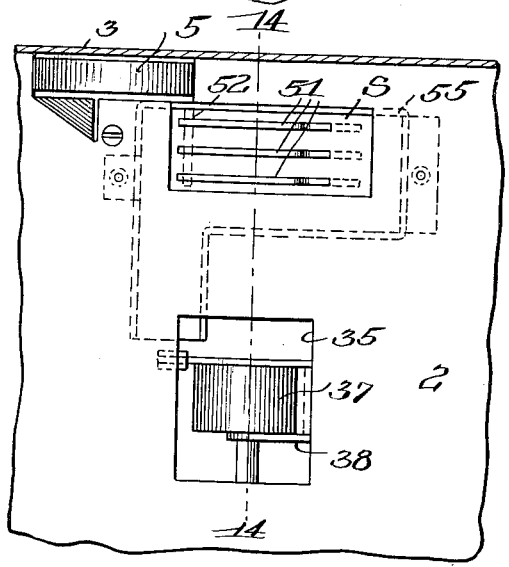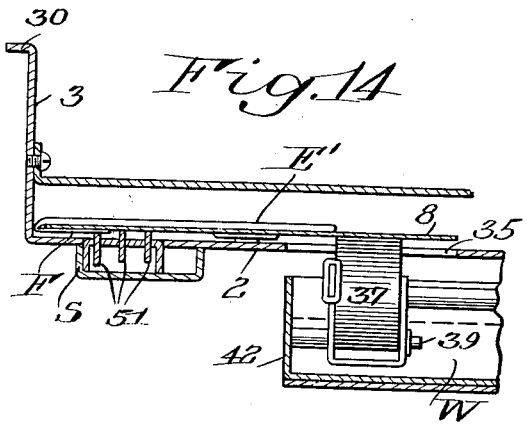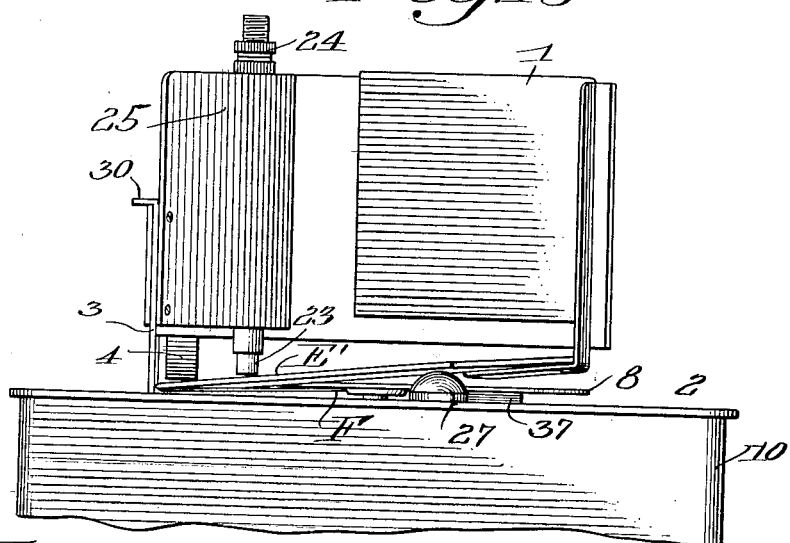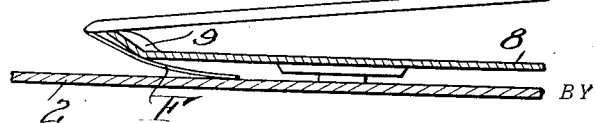

Patented May 8, 1934

1,957,827

UNITED STATES PATENT OFFICE 1,957,827

ENVELOPE SEALING MACHINE

Azel Gay, Rochester, N. Y., assignor to Multipost Co., Rochester, N. Y., a corporation of New York Application May 11, 1931, Serial No. 536,382

6 Claims. (Cl. 91—50)

My present invention relates to machines for handling envelopes, such as mailing machines, which, in rapid succession, seal the envelope, affix a postage stamp, and cancel the letter and postmark the envelope. The invention is useful in machines performing all of these functions or any of them, in fact, it broadly relates to envelope feeding machines. But the feeding mechanism as such constitutes the subject matter of my copending parent application, Serial No. 447,372, filed April 25, 1930, which has matured into Patent Number 1,872,726 dated August 23, 1932 of which this is a continuation in part, while the claims of this application are confined more particularly to the moistening and sealing of the envelope in connection with the feeding operation, and this invention has for its object to provide a simple, efficient and durable mechanism of this character that will operate with precision at high speed particularly in power driven machines.

To these and other ends, the invention resides in certain improvements and combinations of parts, all of which will be more fully described, the novel features being pointed out in the claims at the end of the specification.

In the drawings:

Fig. 1 is a front elevation of an envelope sealing machine constructed in accordance with and illustrating one embodiment of my invention;

Fig. 2 is a rear elevation thereof;

Fig. 3 is a top plan view of the moisture applying device and ejector showing the positions of the parts after an envelope has been delivered by them and carried off;

Fig. 4 is a similar top plan view showing the ejector engaging the flap of an envelope and about to deliver it to the conveying mechanism which seals it and carries it along its intended path;

Fig. 5 is a fragmentary top plan view, partly in horizontal section, but otherwise similar to Figs. 3 and 4, showing the positions of the parts at the instant at which the transfer device or ejector has completely delivered the envelope to the sealing and conveying means;

Fig. 6 is a vertical fragmentary section taken on the line 6—6 of Fig. 5 and showing details of the flap moistening mechanism;

Fig. 7 is a vertical fragmentary section showing a detail of the sealing mechanism;

Fig. 8 is a plan view of the rotary ejector or transfer and moisture applying device;

Fig. 9 is a section on the line 9—9 of Fig. 8;

Fig. 13 is a fragmentary top view of the bed, showing the flap sealing mechanism more in detail;

Fig. 14 is a sectional view taken substantially on the line 14—14 of Fig. 13;

Fig. 15 is a rear view of the envelope stacker or feed box as it appears in Fig. 10, except that the parts are in different positions;

Fig. 16 is an enlarged detailed section taken substantially on the line 16—16 of Fig. 4, showing the manner in which the transfer element cooperates with the envelope flap;

Fig. 17 is a detailed elevation of the cam adjustment for the feeding roll;

Fig. 18 is a central section therethrough;

Fig. 19 is a plan view of a modified form of the rotary ejector or transfer and moisture applying device, and Fig. 20 is a section on the line 20—20 of Fig. 19.

Similar reference numerals throughout the several views indicate the same parts.

Before describing or explaining the showings of the drawings in detail, I will say that the illustrated embodiment of the invention is concerned with a machine that simply feeds and seals the gummed flaps of open envelopes. In describing it, I will first give a sketch of the machine in general with its main functions.

1 is a hopper or box (Figs. 1 to 4 and 10), in which a stack of envelopes is placed with their flaps downward or on the underside, the stack of envelopes being indicated generally at E. This stack holding box 1 is located on top of a bed 2 which is generally the operating table of the machine. It is angularly arranged with respect to a path of envelope feed determined by a vertical guiding wall 3 on the table. Adjacent to this guiding wall 3 and substantially tangential to the table 2 are arranged conveyor and sealing roll couples 4—5 and 6—7 which carry the envelope, ultimately, along the said feeding path defined by the aforesaid guide wall 3 and which are, through mechanism hereinafter described, thrown into and out of cooperation with each other in synchronized relation to the operations of the envelope transferring or ejecting element.

Figure 10:
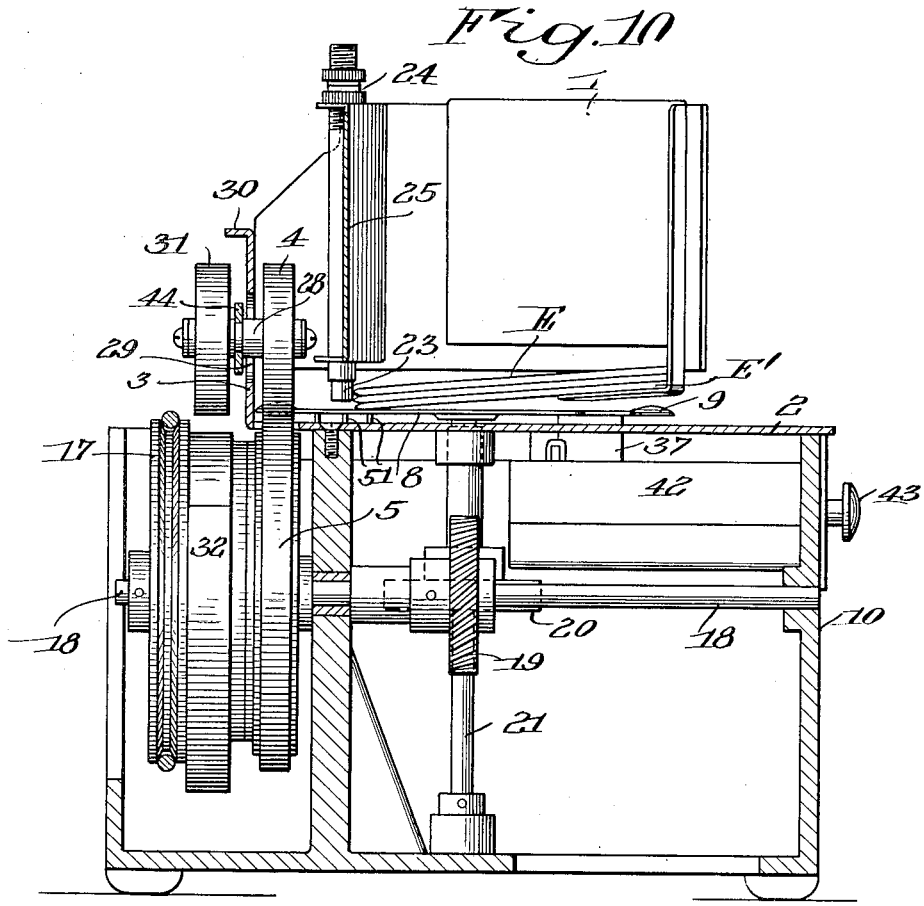
Fig. 10 is a transverse vertical section across the machine showing the envelope stacker or feed box in rear elevation and the feeding drive mechanism.
Figure 11:
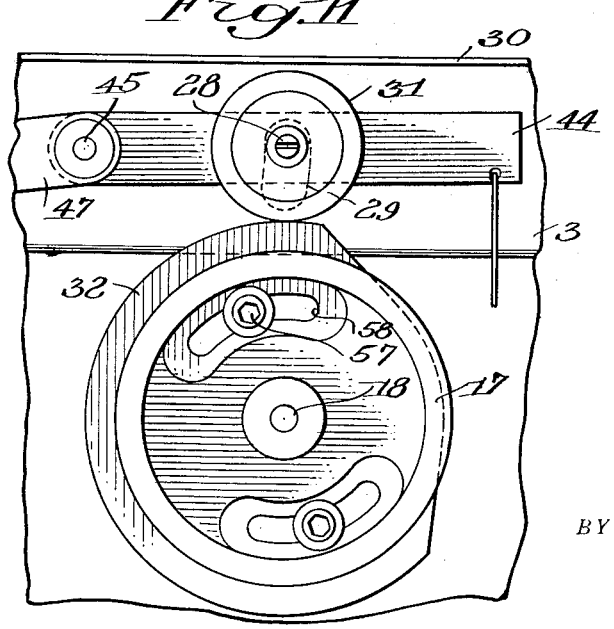
Fig. 11 is a side view in fragmentary detail of certain cam mechanism shown in Fig. 10.

The latter consists, in general, of a rotary disk-like element 8 (shown in detail in Fig. 8) which turns on a vertical axis just above the table or bed 2. It has a pair of raised noses or fingers 9 at diametrically opposite points; it operates beneath the envelope stack box or hopper 1; the said noses 9, in the rotation of the element are adapted to successively engage between the envelope E and its flap F, as shown in Figs. 3, 10 and 16, and swing such bottommost envelope over from the relatively inclined position of the hopper to the position shown in Fig. 5 against the guide wall 3. This element 8 also constitutes a moistening device for the inner gummed flap of the envelope, as hereinafter described, and as it places the envelope in the position of Fig. 5, its further rotation (in the direction of the arrows in the figures) is consistent with its progress through the conveying means. This further rotation completes the moistening of the flap and after being caught by the conveying couple 4—5, the envelope passes through the flap depressing device, indicated generally at S (Figs. 5, 7, 13 and 14) and thence to the delivering couple 6—7, which carries it out of the machine.

In other words, in the embodiment herein shown, there is provided means for feeding an envelope along a certain path of travel, a stacking device or hopper arranged at one side of said path of travel and a transfer element cooperating with the flap of the bottom envelope of such stacking device in such manner as to remove it therefrom, singly, and transfer it in a relatively lateral direction to the feeding means aforesaid.

Referring more particularly to the drawings, and, preliminarily, to Figures 1 to 4 thereof, 10 indicates the main frame of the machine supporting the bed 2 aforesaid. It is a high speed motor driven machine, the motor being indicated at 11. From a pulley 12 on the motor shaft, a belt 13 drives a pulley 14 on a shaft 15 at the rear side of the machine. This pulley 14 through a pulley 16 on the same shaft drives back to a pulley 17 on shaft 18, all as shown in the rear elevation of the machine in Fig. 2. There are thus provided two parallel transverse shafts 15 and 18 appropriately geared down from the high speed motor.

The shaft 18 (Figs. 2 and 10, also 11 and 12) carries a worm or spiral gear 19 meshing with a similar gear 20 on a vertical shaft 21 by which the latter is driven. The transfer or ejecting device 8, previously referred to is fixed to this shaft. It is shown in detail in Fig. 8 and has the beforementioned upwardly projecting fingers 9. Upon each revolution of this element, the said fingers engage, successively, beneath the flaps of two of the envelopes E at the corners of the latter or at least between the flap and the envelope, as shown in detail in Fig. 16. The said bottom envelope in the box or hopper 1 is thereby given, by one or the other of these fingers, a pivotal movement about the corner 22 by which it is thrown from the position of Fig. 3 to that of Fig. 5 against the guide wall 3.

It has always been a problem in the feeding of envelopes from stacks such as that shown at E to effect the engagement and ejection of only a single (bottom) envelope at a time. As shown in Figs. 10 and 15, a soft tipped barrier rod 23 adjustable by means of a thumb screw 24 is provided on the inner wall 25 of the feed box 1, the general object of which is to permit only one envelope to slide therebeneath at a time. But in addition to this, I provide on the table 2 in the region of the corner 26 of the stack of envelopes E a button or raised projection 27 which tilts the whole stack and particularly the bottom envelope in such manner that room is given for its flap (as shown in Fig. 16) to separate or space itself from the table 2 so that the raised finger 9 (that is, one of the two) of the transfer disk 8 will surely engage it. In other words, while the bottommost envelope is being removed laterally into its further conveying path, it turns on a pivotal point in the region of 22 but its only other real point of resistive contact is at 26 where the button 27 holds it tilted for the purposes aforesaid.

Figure 12:
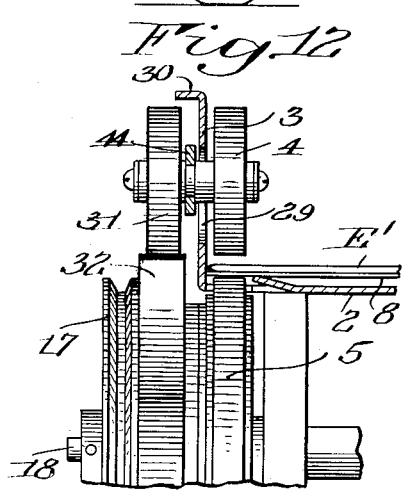
Fig. 12 is a repetition in fragmentary detail of this same cam mechanism as it appears in Fig. 10, except that the parts are in different positions.

In passing from the position of Fig. 3 to that of Fig. 5, the envelope is presented between the feed roll couple 4—5. The latter or under roll is fixed upon the aforesaid shaft 18 that is continuously driven, as indicated at 56 in Fig. 18. The complementary upper roll 4 is journalled on a jockey shaft 28 that rides in a slotted bearing 29 in a side plate 3 of the frame and table 2. This roll 4 is preferably covered with rubber or otherwise made competent to frictionally engage and advance the envelope as is companion roll 5. But fixed also on the jockey shaft 28 is a companion roller 31 (Fig. 10) that rides on a cam 32, which cam is in the form best shown in Fig. 17. It is rotatable for adjustment relatively to feed roll 5 by means of bolts 57 threaded into the latter and extending through arcuate slots 58 in the cam, the latter turning for this purpose on a hub 59 on the feed roll and thus being indirectly fastened to shaft 18. As this shaft 18, as before described, turns shaft 21 of the transfer device 8, this adjustment of the cam times the actuation of roll 31 to synchronize properly with the rotation of the transfer element 8. Said roll 31 is shown on the low point of the cam in Fig. 10, so that feed rolls 4 and 5 are in contact or in position to compress and feed an envelope between them, but in Fig. 12, roll 31 is on the high point of the cam separating feed roll 4 from its couple 5, so that the bottommost envelope just referred to (and indicated in Figs. 10 and 12 at E') may be received between them. The timing of the gearing between shafts 21 and 18 by means of the adjustable cam 32 is such that this condition occurs when the envelope is presented squarely alined against the guide wall 3 in the path of its further conveyance, as shown in Fig. 5, due to the previously described action of the transfer disk 8. Cam 32 immediately lowers controlling roller 31 riding thereon on jockey shaft 28 and drops feed roll 4 upon the envelope against its driving couple 5, which is continuously turning so that the envelope E' is immediately shot endwise along its ultimate rectilinear path.

In other words, the ratio between the drive of cam 32 and transfer element is two to one, so that rolls 31 and 4 are lifted each time one of the fingers 9 on the fastener element engages an envelope and presents it to its line of travel.

Before describing the action of the machine upon the envelope or letter from this point on, I will stop to describe how the disk transfer element 8 functions as a moistener for the flap of the envelope while it is transferring the latter to the feeding couple 4—5, and how the flap is held against it for thorough wetting of the gum.

It is clear that the mechanism heretofore described has the capacity of swinging the bottommost envelope E' from the stack, E, into the grip of this initial feeding couple 4—5 (Fig. 10). Referring now to Figs. 5 to 9, on the one sheet, the machine of the present embodiment of the invention, beyond transferring the envelope from the stack E to the line of travel at the side thereof initiated by the rolls 4—5 against guide wall 3, is equipped also to moisten and seal the envelope through the medium in the present instance, of the transfer element 8. For this reason, the transfer element 8, as shown in detail in Figs. 5 and 8, provided with the pick-up fingers 9 also comprises between these fingers the moistening and carrying areas indicated generally at 33—33, as appears in Fig. 5. A functional idea to be carried in mind at this point of operation of the machine is that the portions 33 (as indicated by the arrow of Fig. 5) are travelling in the direction of exertion of the conveying couple 4—5 at the time the latter commences to act jointly with the said portions 33.

For all these reasons, the transfer element 8 above the table 2 cooperates through an aperture 35 in the latter (Fig. 6) with a moistening roll 37 carried by an arm 28 pivoted at 39 that is caused by a spring 40 (under the control of an adjusting screw 41) to bear against the underside of the disk 8. Therefore, as the disk 8 starts to perform its transferring function, at the beginning of its cycle, of first selecting the undermost envelope E' from the stack E, as shown in great detail in Figs. 15 and 16, a film of water, indicated at W in Fig. 6, adhering to the surface of moistening roll 37 is transferred to that side of the portions 33—33 of disk 8, which, in the cycle of the latter, keep in contact with the said moistening roll 37.

A detail, apparent from the drawings, is that the moistening roll 37 is submerged in a tank 42 in the nature of a drawer that may be pulled or pushed out in the frame of the machine for filling or other purposes by means of a pull knob 43 (Figs. 1, 3 and 10, for instance).

It is clear from the foregoing that the transfer or feeding disk on each rotation not only selects the bottommost envelope E' from the stack E, individually, but moistens its gummed surface located in the accustomed place and then presents the envelope in its ultimate path of feed through couples 4—5 and 6—7 while, at this time, operating in a field of rotation that is consistent with this ultimate path of travel on the bed 2.

As shown best in Figs. 2, 3, and 10, the jockey shaft 28 carrying the feed roll 4 is carried by a rock arm 44 pivoted at 45. It is normally held down to place the rolls 4 and 5 in feeding cooperation by a spring 46 at the outer end of the rock arm. Similarly pivoted at 45 is a rock arm 47 having a spring 48 that has a tendency to hold feed and sealing roll 6 down upon its couple 7, for which purpose said roll 6 is mounted on a stud 49 on lever arm 7 that acts through a slot 50 in guide wall 3. This roll 6 with its couple 7 compresses and seals the envelope as rapidly as it may be done in a high speed machine and after passing the couple 6—7, the sealed envelope is delivered by this couple either to any one of the several and consecutive envelope or letter treating instrumentalities heretofore referred to in the beginning of this specification or deposited as a finished product, so far as this particular element is concerned.

To briefly review the cycle, the bottommost envelope E' is swung from the lateral stack E into the rectilinear path of travel; is received between the initial feeding couple 4—5 by which it is at least partially sealed; is meanwhile moistened as to its gummed flap by the transfer device 8 that carries it into that path; is shot along that path in accord with the motion of element 8, which is in the same general direction of travel (as a rotary forwarding motion is converted into a rectilinear forwarding motion) against the guide plate 3; is picked up by the final sealing roll couple 6—7 and finally projected off of the end of the table 2.

In connection with the moistening of the gummed flap of envelope E' (and somewhat as a sealing operation) I provide an instrumentality not heretofore referred to, which consists of a plurality of fingers 51 arranged on pivots 52 (see Fig. 7) and pressed by springs 53 to rise in slots 54 in the bed plate 2 and within a casing 55 on the bottom of the latter just in advance of the time that the travelling envelope is delivered to the sealing and ejecting couple 6—7. These (also shown in dotted lines in Fig. 5) are within the swing of the greatest radius 34 of the member 8 just as the latter is throwing the undermost envelope E' against guide wall 3 and moistening it while it has already been caught by the feeding couple 4—5 and is started on its way. The function of these fingers is to insure contact of the gummed portion of the flap with the underside of the all moistened portions of the transfer disk 8, so that the latter will not rotate idly with respect to the transfer of sufficient water from it to the gummed side of the flap.

As before stated, I have illustrated in Figs. 19 and 20 a modified form of ejector or transfer element there indicated at $8^a$ corresponding to element 8 of Figs. 8 and 9, except that the flap engaging fingers there indicated at $9^a$ are elongated radially extending a greater distance toward the axis, which construction I have found useful with some types of envelopes, particularly those of heavier stock.

As at first stated and in brief, my present invention may be utilized to feed envelopes singly and rapidly along a given path after moistening and sealing them with the moistening combined with the feeding and to deliver them moistened and sealed to any further mail treating instrumentality that may be associated with the mechanism, as a unit, if such disposition is desired.

I claim as my invention:

1. In an envelope handling machine, the combination with means for feeding an envelope along a certain path of travel, of a stacking device arranged at one side of said path of travel and adapted to support a stack of envelopes in a vertical pile with their flaps undermost and their greater dimension diagonal with relation to said path of travel, and a transfer element having moistening means and adapted to engage the flap of the undermost envelope therein and transfer it in a relatively lateral direction with a pivotal movement to the said feeding means while at the same time moistening said flap.

2. In an envelope handling machine, the combination with a table and means for feeding an envelope, horizontally, along a certain path of travel at one side of said table, of a stacking device arranged on the table at one side of said path of travel and adapted to support a pile of envelopes, flap down, with their greater dimension diagonal with relation to the latter, a transfer element, a moistening means therefor, said transfer element cooperating between the flap and body of the undermost envelope in the stack a button on the table beneath the stack for tilting the latter to expose the lowermost flap, and means for driving the transfer device and the moistening device whereby the former engages and moistens the flap of an envelope and delivers it to the envelope feeding means.

3. In an envelope handling machine, the combination with means for feeding an envelope along a certain path of travel while in a horizontal position, of a stacking device arranged at one side of said path of travel and adapted to hold a vertical pile of envelopes with their flaps undermost, a horizontally disposed transfer blade arranged to engage the bottommost envelope between its body and its flap as it lies in the stack and to transfer it horizontally from the latter to the envelope feeding means, and means for moistening the portion of the transfer device which so passes between the flap of the envelope and the body thereof.

4. In an envelope handling machine, the combination with means for feeding an envelope along a certain path of travel including a feeding couple relatively bodily movable and intermittently cooperating with one another with feeding pressure, of a stacking device, a transfer element associated with the stacking device and adapted to engage the flap of an envelope therein and thereby transfer the envelope in a lateral direction to the feeding means, said transfer element being provided with moistening means for the said flap engaging portion, and means for syncronizing the actuating motion of the said feeding couple and the said transfer and moistening element whereby the former are open to receive the said envelope at the time that it is so transferred.

5. In an envelope handling machine, the combination with means for feeding an envelope along a cerain path of travel including a separable feeding couple intermittently cooperating with one another with feeding pressure, of a stacking device, a transfer element associated with the stacking device and adapted to engage the flap of an envelope therein and thereby transfer the envelope in a lateral direction to the feeding means, said transfer element being provided with moistening means for the said flap engaging portion, and means for synchronizing the actuating motion of the said feeding couple and the said transfer and moistening element whereby the former are open to receive the said envelope at the time that it is so transferred, said means comprising a shaft to which one element of the feeding couple is fixed, an actuator for the other element of the couple, a cam rotatably adjustable on the first mentioned element and cooperating with the second mentioned element, and means for driving the shaft.

6. In an envelope handling machine, the combination with means for feeding an envelope along a certain path of travel, of a stacking device arranged at one side of said path of travel and adapted to support a stack of envelopes in a vertical pile with their flaps undermost, and a transfer element having moistening means adapted to engage the flap of the undermost envelope therein and transfer it in a relatively lateral direction to the said feeding means while at the same time moistening said flap, said transfer element comprising a horizontal rotatable disk having a plurality of fingers thereon offset from the plane of the disk adapted to successively engage the envelope flaps and intervening flat portions adapted to apply moisture to the flaps.

AZEL GAY.